(No Model.)

C. SELDEN.
MECHANICAL TELEPHONE.

No. 291,094. Patented Jan. 1, 1884.

Witnesses:
Ernest Abshagen
Thos. Toomey

Inventor:
C. Selden

By his Attorney: H. C. Townsend

UNITED STATES PATENT OFFICE.

CHARLES SELDEN, OF ST. LOUIS, MISSOURI.

MECHANICAL TELEPHONE.

SPECIFICATION forming part of Letters Patent No. 291,094, dated January 1, 1884.

Application filed August 6, 1883. (No model.)

*To all whom it may concern:*

Be it known that I, CHARLES SELDEN, a citizen of the United States, and a resident of St. Louis, State of Missouri, have invented certain new and useful Improvements in Mechanical Telephones, of which the following is a specification.

My invention relates to so-called "mechanical" or "acoustic" telephones; and its object is to provide a means whereby the strain or pull of the line upon the diaphragm or other vibratory surface may be counteracted or removed, so that said diaphragm may respond more readily and sensitively to the action of sound-vibrations and may reproduce and transmit sound with greater accuracy.

My invention relates, also, to the form of the sound-directing tube by which sound-vibrations are directed to the vibratory surface, the object of this part of the invention being to more effectively bring all the sound-waves to bear upon the diaphragm.

My invention consists in combining, with the diaphragm or other vibratory surface, suitable means for exerting a force upon the same in opposition to the strain or pull exerted by the line.

My invention consists, also, in the combination, with the diaphragm, of a sound-directing tube, having a paraboloidal reflecting-surface opposite the diaphragm.

My invention consists, further, in the combination, with the diaphragm, of a self-adjusting counter-balance that exerts a counter pull or strain upon the diaphragm automatically adjusted to the strain exerted by the line.

My invention consists, also, of certain specific combinations that will be set forth in the claims hereto annexed.

In carrying out my invention, I prefer to employ the counterbalancing effect of a weight or spring; but I do not limit myself to such a device, my invention consisting, broadly, in the combination, with the diaphragm, of any means adapted to exert upon the same a pull or strain counter to that of the line.

Figure 1:
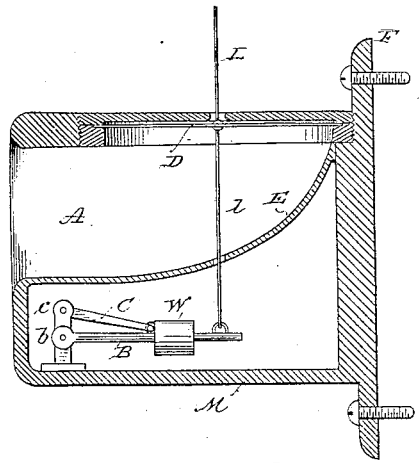
Figure 2:
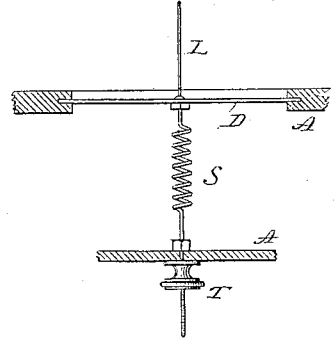
Figure 3:
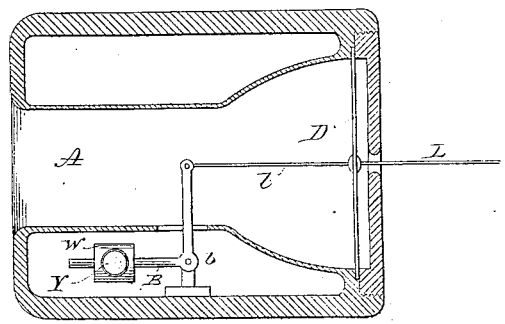

In the accompanying drawings, Figure 1 is a vertical section of a telephone embodying my invention. Fig. 2 illustrates a modification and shows the manner in which a spring may be made to take the place of the weight. Fig. 3 is a vertical section of an instrument in which the diaphragm is vertical, instead of horizontal, as in Fig. 1, and in which the counterbalancing weight is made adjustable by hand and exerts a pull upon the diaphragm through an elbow-lever.

Referring to Fig. 1, M represents the casing of the instrument, provided with extensions F, by which it may be clamped to a wall or other suitable support.

D indicates the diaphragm or other vibratory surface, supported in any ordinary or suitable manner; and L, the line or cord by which the vibrations are communicated to or from a distant instrument.

A is the sound-directing tube, by which sounds are directed to the diaphragm or from said diaphragm to the ear. Said tube is provided with a paraboloidal surface, (indicated at E,) by means of which all sound-vibrations entering the tube and striking said surface are reflected in straight lines upon the diaphragm D. To the opposite side of the diaphragm from the line L is connected a cord, $l$, through which a weight, W, adjustable upon a lever, B, supported at $b$, imparts a strain or pull upon the diaphragm approximately equal to and opposite to that of the line, so that the diaphragm, instead of being warped and strained, as usual, will retain a natural condition, and will therefore more readily and properly respond to any vibrations affecting it. The weight W may be adjusted to the pull of the line by hand; or an automatic adjustment of the same may be effected by any suitable mechanism that will tend to move the weight further from the fulcrum of the lever as the end of the lever tends to rise, owing to any increased pull of the line. An automatic adjustment of this kind may be effected by means of a lever, C, pivoted at $c$, and so arranged or connected with weight W that when it is turned on its pivot by the movement of lever B, under an increased pull of the line, its end, in swinging, will force the weight W away from the pivot $b$, and; vice versa, when the strain of the line diminishes, will draw the weight W back so as to prevent the latter from exerting too great a pull.

Instead of a weight, I may obviously use a spring, as indicated in Fig. 2, where S indicates a coiled spring, connected at one end with the diaphragm D, and at the other with a nut, T, by which its pull upon the diaphragm may be adjusted.

In Fig. 3 the diaphragm D is arranged vertically, and the lever B, which, through the connection $l$, exerts a counter-pull upon the diaphragm, is a bell-crank or elbow-lever. In this instance the weight W is not automatically adjusted, but may be set by hand to any desired position suited to the strain of the line, and may be fixed in such position on the lever B by means of a set-screw, Y.

I do not limit myself to any particular construction of telephone, as my invention is obviously applicable to any form in which the strain or pull of the line will cause a bulging or distortion of the diaphragm or other vibratory surface.

What I claim as my invention is—

1. The combination, in a mechanical telephone, with the diaphragm or other vibratory surface with which the line or cord is connected, of a counter-balance for counteracting the strain of the line or cord upon the diaphragm.

2. The combination, with the diaphragm or other vibratory surface for a mechanical telephone, of means for exerting a strain or pull counter to that of the line or cord upon the diaphragm, so as to oppose the tendency of the latter to bias under the strain of the line.

3. The combination, with the diaphragm or other vibratory surface for a mechanical telephone, of an adjustable counterbalancing weight or spring, arranged to exert a pull upon the diaphragm contrary to that of the line.

4. The combination, with the diaphragm or other vibratory surface for a mechanical telephone, of a self-adjusting counter-balance that acts on the diaphragm in contrary direction to the strain or pull of the line.

5. The combination, with the diaphragm, of a lever connected by a cord to the side of the diaphragm opposite the line, and a weight adjustable on said lever, as and for the purpose described.

Signed at St. Louis, and State of Missouri, this 17th day of July, A. D. 1883.

CHARLES SELDEN.

Witnesses:
JOHN D. ST. MAUR,
NICHOLAS D. FRICK.